May 19, 1931. L. BIEL 1,805,902
HOG FEEDER
Filed Feb. 26, 1929 2 Sheets-Sheet 1
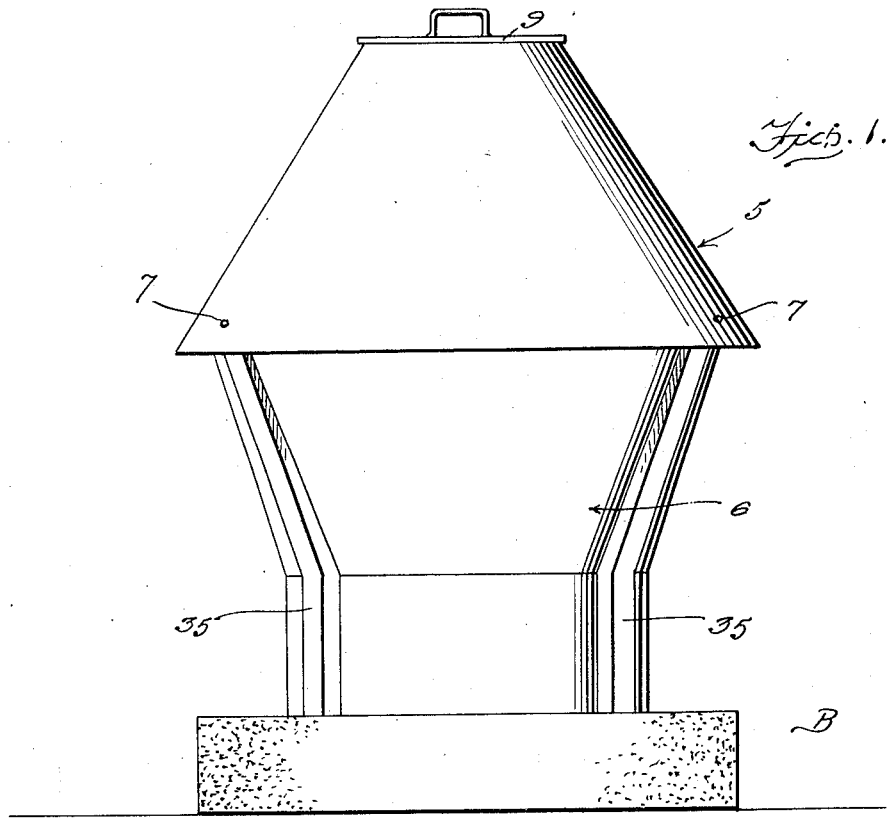
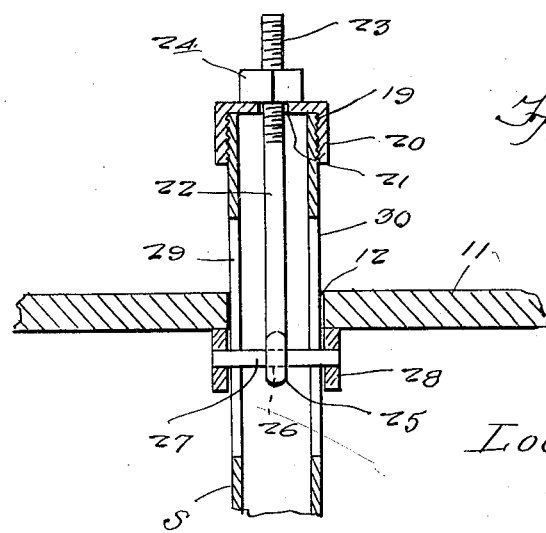
Inventor
Louis Biel
By Clarence A. O'Brien
Attorney

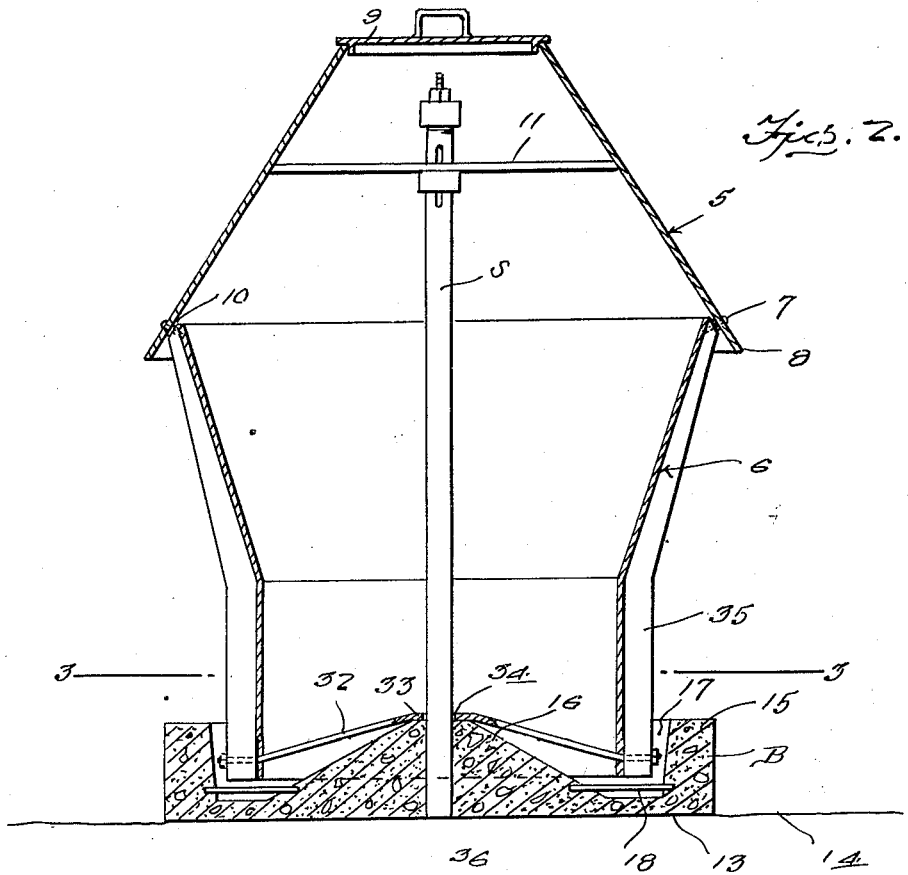
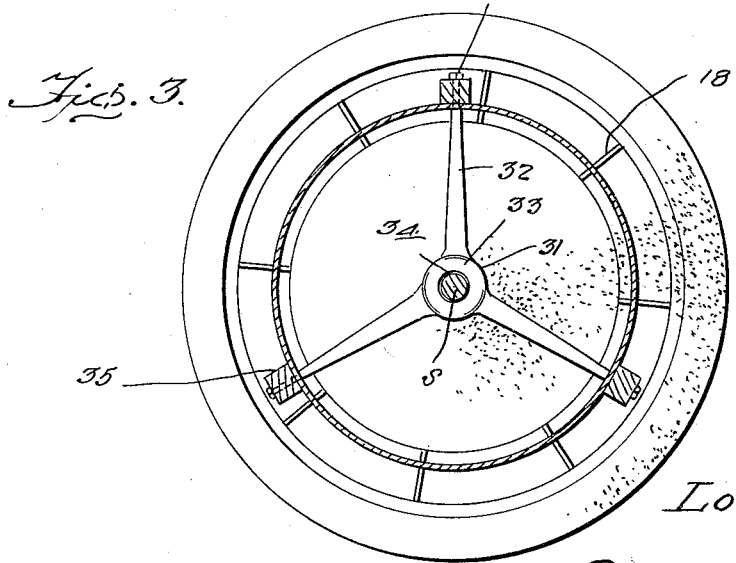

Patented May 19, 1931

1,805,902

UNITED STATES PATENT OFFICE

LOUIS BIEL, OF RIDGEWAY, IOWA

HOG FEEDER

Application filed February 26, 1929. Serial No. 342,846.

This invention relates to hog feeders and one of the objects of the invention is to provide for utilizing the aggressiveness of the feeding animals to rotate the feed casing so as to insure a supply of feed within reach of the animal.

Another object of the invention is to provide for controlling the amount of feed to be eaten by the animal.

Further objects of the invention are to provide in a manner as hereinafter set forth a device of the character described, which is strong, compact, and durable, highly efficient for its intended purpose, thoroughly reliable in its operation, thoroughly stable on its support, weather proof in its construction, involving a very simple and convenient assembly of its parts, and comparatively inexpensive to manufacture.

With the foregoing and other objects in view, the invention consists in the novel construction, combination and arrangement of parts as hereinafter more particularly described and illustrated in the accompanying drawings, but it is to be understood that changes, variations, and modifications may be resorted to, which fall into the scope of the claim hereunto appended.

In the drawings, wherein like reference characters denote like parts throughout the several views:

Figure 1 is a side elevation of the device, in accordance with this invention.

Figure 2 is a central vertical section of the device.

Figure 3 is a horizontal section taken substantially on the line 3—3 of Figure 2, and Figure 4 is a detailed sectional view partly broken away and illustrating the means of adjusting the feed casing in accordance with this invention.

The hog feeder in accordance with this invention is to be used in placing food at the disposal of the animals so as to require no attendance of the farmer except to replenish the food in the food casing. Inasmuch as the various animal feeds are light and subject to clogging or clotting in their gravity feeding, it is the prime object of this invention to have the casing rotatable by operation of the aggressive animals, while at the same time utilizing a part of the structure of the device to beat down the feed and prevent clogging or clotting thereof at the lower extremities of the casing.

Referring to the drawings in detail, the casing A is formed with a body portion of sheet metal or other suitable materials and is made in two sections indicated generally at 5, 6, secured together intermediate the ends of each section by rivets 7 or other suitable hold-fast devices.

The body portion A is hollow on its interior and the sections 5 and 6 have a general configuration of an inverted frusto-conical section having the bases in abutment. The latter configuration forms the body portion with a bulged area where the two inverted sections meet in abutment.

The upper body section 5 is formed with the lower edges 8 thereof projecting beyond the body of the lower section 6 to provide eaves overhanging the bottom section to make the body portion of the casing weatherproof. The bulging portion of the upper section 5 has a removable cover 9 frictionally engaging with the edges thereof. The upper edges of the lower sections 6 are slightly spaced from the lower walls of the section 5, so as to allow circulation of air to prevent the feed from being spoiled in case of storage therein for any considerable length of time. The space referred to is indicated at 10, in Figure 2 of the drawings.

Intermediate the top and bottom of the section 5 and interiorly thereof is a radially extending cross bar 11, which is secured at its ends to the walls of the casing 5 and is provided with an opening 12 extending through the bar for rotatably mounting the upper portion of the casing A on the spindle edge, in a manner to be presently described.

Spaced from the lower end of the casing A is an annular base B, preferably formed of concrete, but it is pointed out that iron or other heavy materials would be suitable for the purpose. The annular base B has a lower base 13 which is adapted to rest upon the ground indicated at 14 and the marginal edges of the base is formed with an upstanding marginal peripheral flange 15, and an upstanding conical shaped support 16 at the center of the base. The base of the central conical section 16 and the inner face of the flange 15 forms an inset annular trough 17 with respect to the upper face of the base B. The outer wall of the trough 17 is spaced with respect to the lower end of the casing, so as to provide a space for the animals to eat the feed from the trough. A series of radially extending circumferentially rods 18 extend in spaced relation across the bottom of the trough 17 and the opposite ends of the rods are anchored in the flange 15 and the conical support members 15, to prevent the wasting of the feed and also to prevent the animals from injuring the bottom of the casing A.

The spindle has the bottom end anchored in the conical support member 16 and extends from the axis of the base B through the apex of the cone 16 and in a perpendicular plane with respect to the ground 14.

The spindle S is tubular in shape and is peripherally threaded, as at 19, at its upper end. A screw cap 20 is secured to the threaded end 19, and said cap is provided with an opening 21, extending through the top thereof along the axis of the spindle S. A bolt 22 is loosely mounted in the upper end of the hollow spindle S, extends along the axis thereof for a portion of its length, the threaded upper ends 23 of which extend through the opening 21 in spaced relation to the walls thereof. A nut 24 is mounted on the threaded end 23 of the bolt and the nut 24 supports the bolt within the spindle S by abutting the upper face of the cap 20 and the lower end of the bolt 22 which is confined within the hollow spindle S is provided with an eye 25, having an opening 26 in alignment with the diameter of the spindle S, through which extends a rod 27, the opposite ends of which are secured flush with the outer face of an annular collar 28, which is slidably mounted on the outer perimeter of the spindle S. Adjacent the top of the spindle S, the walls thereof are provided with aligned diametrically registering, longitudinally extending slots 29, and 30, through which the collar supporting rod 27 extends. The bottom of the cross bar 11 is supported on the top of the annular collar 28 and the spindle S extends through the opening 12 in the cross bar. By turning the nut 24 in either direction, the cross bar 11 is raised or lowered, thereby raising or lowering the casing A with respect to the trough 17.

The bottom of the casing A is rotatably supported on a tripod 31 having radially extending legs 32, merging at their inner ends in an annular boss 33, and the lower face of the boss 33 is supported on the apex of the conical section 16 of the base B. The boss 33 is provided with a central opening 34, by which it is journaled to the spindle S. The outer ends of the legs 32 of the tripod extend through the vertically disposed bumpers 35 to be presently described and are secured thereto by nuts 36, which are mounted on the threaded outer end of the legs 32. The legs 32 are three in number and extend radially in the same plane, and considered with the secured outer ends forms a combined support and feeder member in the device.

The legs support the lower end of the casing in rotatable relation with respect to the spindles, while at the same time, the rotation thereof beats the feed down into the trough 17.

The bumper members 35 project laterally of the outer face of the lower section 6 of the casing, and are secured thereto. The bumper members are longitudinally disposed on the outer face of the casing and form abutments by which the feeding animals may rotate the casing in their aggressiveness for acquiring food. In addition to be used as bumper members, they add considerable reinforcing for the walls of the casing A, and particularly the lower section 6 thereof.

The bumper members are three in number, but it is within the contemplation of the invention to provide as many bumpers as there are legs on the combined supporting and beating member 33.

What I claim is:

A feeder of the character described comprising a base, a vertical hollow standard mounted on the base having longitudinal slots in an upper portion thereof, an apertured cap on the upper end of the standard, a hanger suspended for vertical adjustment from the cap and depending therefrom into the standard, a rod mounted transversely on the lower end of the hanger and operable in the slots, a collar mounted on the end portions of the rod and slidably encircling the standard, a horizontal bar slidable on the standard and resting on the collar, and a casing supported on the ends of the bar.

In testimony whereof I affix my signature.

LOUIS BIEL.